I. SOLOMON.
SPRING MOTOR.

No. 185,872. Patented Jan. 2, 1877.

Witnesses
W. R. Singleton
C. W. Connell

Inventor
Isaac Solomon
Per Blanchard & Singleton
Attys

UNITED STATES PATENT OFFICE.

ISAAC SOLOMON, OF SOLOMON'S ISLAND, MARYLAND.

IMPROVEMENT IN SPRING-MOTORS.

Specification forming part of Letters Patent No. 185,872, dated January 2, 1877; application filed November 17, 1876.

*To all whom it may concern:*

Be it known that I, ISAAC SOLOMON, of Solomon's Island, in the county of Calvert and State of Maryland, have invented certain new and useful Improvements in Spring-Motors; and I do hereby declare that the following is a full, clear, and exact description thereof, which will enable others skilled in the art to which it appertains to make and use the same, reference being had to the accompanying drawings, and to the letters of reference marked thereon, which form a part of this specification—

Figure 1:
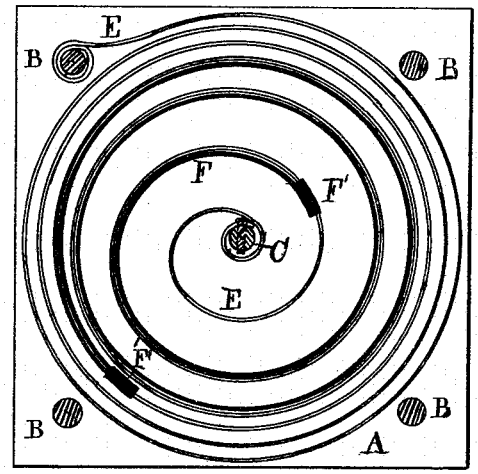
Figure 2:
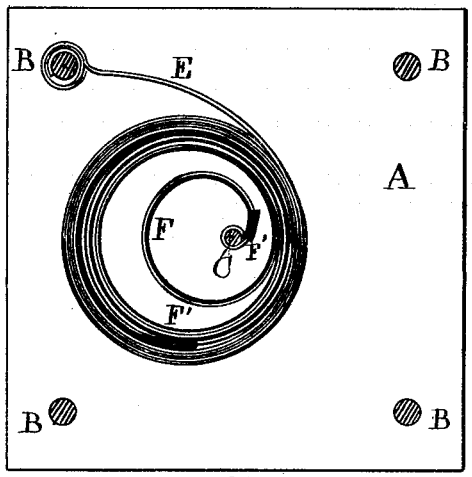
Figure 3:
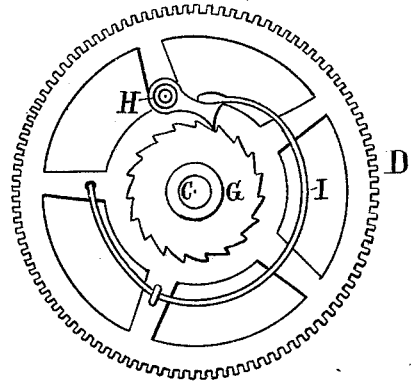

Figure 1 being a plan view of my improved motor, showing the springs in their uncoiled condition and the mainspring as secured to a post or fixed part of the frame-work, and its opposite end to the shaft upon which it is wound, the compensating-spring being shown in position, with its ends resting upon the mainspring. Fig. 2 is also a plan view, showing the springs coiled ready for use, the position of the inner end of the compensating-spring being shown when the two are coiled; and Fig. 3 is a plan view of the ratchet-wheel and pawl for retaining the springs in their coiled condition, and of a spur-wheel for giving motion to the mechanism to be driven.

Corresponding letters denote corresponding parts in all of the figures.

This invention relates to a motor the power of which is derived from the action of springs in their effort to uncoil themselves; and it consists in applying to what I have termed the "mainspring" an auxiliary or compensating spring, as hereinafter more fully described.

In constructing motors of this character I employ any suitable frame-work for receiving and keeping in position the operative parts, the one shown consisting of two plates of metal, the lower one, A, only being shown in the drawing. This plate may be rectangular in form, or of any other form desired that will leave room outside of the springs when uncoiled, and of the driving-wheel, for the insertion of rods or posts B B, which extend upward or outward for a distance sufficiently great to leave between the plate A and another one placed upon the outer ends of said posts a space sufficiently large to receive the springs and the driving mechanism. The upper and lower plates are secured to the posts, and are kept at their proper distances apart, thereby they thus being made to form the bearings for the central shaft C, around which the springs are coiled. For furnishing power to the driving-wheel D, and through it to the mechanism to be driven, two separate but co-acting springs are used, one of which I have denominated a mainspring and the other an auxiliary or compensating spring. The mainspring has its outer end coiled around or otherwise secured to one of the posts B of the frame, while its inner end is secured to the shaft C at any convenient point, so that, by turning said shaft by means of a wrench or key placed upon its outer end, this spring and its compensating ally will be changed from their unwound condition, as shown in Fig. 1, to their condition shown in Fig. 2, in which last-named case they are in the proper condition to give out their power.

It is well known that when a single spring is used for the purpose of driving mechanism the amount of force is not constant, but that when the spring first begins to uncoil it exerts a greater amount of force than it does when it is partially uncoiled; and in order that this defect may be remedied I place upon the inner surface of the mainspring E a compensating-spring, F, the ends of which are provided with lips F', as shown in Figs. 1 and 2, which serve to keep it in position upon the mainspring, but which allow its outer end to move freely thereon, so that as the springs are wound up it may move inward toward the shaft upon which they are coiled, and when the springs unwind to give out the force it may move outward upon said mainspring, and thus compensate for the loss of power consequent upon the unwinding of the mainspring. The position in which this compensating-spring is to be placed upon the mainspring, and its length, will be determined by the length of the said mainspring and the force it is made to exert. In any case it will be found advisable to so place it that when in its unwound condition its inner end will be far enough from the shaft to allow the mainspring to be wound once or twice around said shaft before commencing to coil the compensating-spring; and in cases where heavy and strong springs are used it may be placed at a greater distance from the inner end of the mainspring. The length of the compensating-spring will also be governed by circumstances. When it is desired to have it act throughout the entire portion of the latter part of the unwinding of the mainspring it will be of such length as to reach well out toward the outer end thereof; or if it is found that the mainspring exerts a sufficient amount of force when it first begins to uncoil, but fails to do so when nearly uncoiled, then the compensating-spring may be moved farther toward the outer end of the mainspring, and thus the variations in the mainspring will be compensated for automatically.

The main or driving wheel D is fitted upon the shaft C, so as to turn thereon, or, rather, so as to remain stationary when the springs are being wound up, but is made to move with said shaft when the springs are being unwound by means of the ratchet-wheel G, pawl H, and spring I, as shown in Fig. 3, or in any other suitable manner.

This invention is designed primarily as an improvement upon motors for driving sewing-machines, for which purpose it is peculiarly adapted; but it is applicable to all kinds of motors, the moving force of which is derived from coiled springs. I do not, therefore, limit myself to its application to any particular purpose; but Having described my invention, what I claim, and desire to secure by Letters Patent, is—

The use, in connection with a coiled spring, such as is used for driving sewing-machines and other mechanism, of a compensating auxiliary spring placed upon such coiled spring in such a manner that it may be moved lengthwise thereon, and thus made to compensate for the difference in the amount of force applied to drive the mechanism by the coiled or main spring, substantially as described.

In testimony that I claim the foregoing as my own I affix my signature in presence of two witnesses.

ISAAC SOLOMON.

Witnesses:
C. M. CONNELL,
THOMAS C. CONNOLLY.